United States Patent
Fahlsing et al.

(10) Patent No.: US 9,566,607 B2
(45) Date of Patent: Feb. 14, 2017

(54) SURFACE APPEARANCE SIMULATION SYSTEMS AND METHODS

(71) Applicant: ILLINOIS TOOL WORKS INC., Glenview, IL (US)

(72) Inventors: Roger A. Fahlsing, Valparaiso, IN (US); Alan Robert Kaufman, Crown Point, IN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 815 days.

(21) Appl. No.: 13/828,122

(22) Filed: Mar. 14, 2013

(65) Prior Publication Data

US 2014/0272296 A1    Sep. 18, 2014

(51) Int. Cl.
| | |
|---|---|
| *B05D 1/36* | (2006.01) |
| *B32B 27/32* | (2006.01) |
| *B32B 3/10* | (2006.01) |
| *B32B 3/26* | (2006.01) |
| *B32B 38/08* | (2006.01) |
| *B44C 5/04* | (2006.01) |

(52) U.S. Cl.
CPC . *B05D 1/36* (2013.01); *B32B 3/10* (2013.01); *B32B 3/263* (2013.01); *B32B 27/322* (2013.01); *B32B 38/08* (2013.01); *B44C 5/0476* (2013.01); *Y10T 428/24364* (2015.01); *Y10T 428/24372* (2015.01); *Y10T 428/24802* (2015.01); *Y10T 428/3154* (2015.04)

(58) Field of Classification Search
CPC ........ B05D 1/36; B32B 27/322; B44C 5/0476
USPC ........................................... 427/402
See application file for complete search history.

(56) References Cited

U.S. PATENT DOCUMENTS

| | | | | |
|---|---|---|---|---|
| 4,610,929 A | * | 9/1986 | Mosser | ............ C09D 5/12 428/421 |
| 2006/0061622 A1 | | 3/2006 | Suzuki | |
| 2007/0229609 A1 | | 10/2007 | Kim | |
| 2008/0129798 A1 | | 6/2008 | Wee | |

FOREIGN PATENT DOCUMENTS

| | | | | |
|---|---|---|---|---|
| DE | 10227430 A1 | * | 1/2004 | ............ B32B 27/18 |
| DE | 102004034790 A1 | | 2/2005 | |
| EP | 1093857 A1 | | 4/2001 | |
| EP | 2264259 A2 | | 12/2010 | |

(Continued)

OTHER PUBLICATIONS

ISR and WO for PCT/US2014/062304 dated Feb. 6, 2015 (13 pgs.).
ISR for PCT/US2014/022270; 14 pgs.

*Primary Examiner* — Alexander Weddle
(74) *Attorney, Agent, or Firm* — Christopher R. Carroll; The Small Patent Law Group LLC

(57) ABSTRACT

A structural member includes a simulated surface appearance. The structural member includes a substrate, plural intermediate layers, and a top coat. The plural intermediate layers are applied over at least one surface of the substrate, with at least some of the plural intermediate layers configured to cooperate with each other to provide a simulated appearance for the structural member. The top coat is applied outward of the plural intermediate layers. The top coat is relatively thin and is configured for use with exterior applications. The top coat includes a base configured for UV resistance and an additive configured to provide abrasion resistance.

8 Claims, 5 Drawing Sheets

(56) References Cited

FOREIGN PATENT DOCUMENTS

| EP | 2463116 A1 | 6/2012 |
|----|------------|--------|
| JP | S58108158 A | 6/1983 |
| JP | 2001047625 A | 2/2001 |
| JP | 2012071594 A | 4/2012 |
| WO | 2009065769 A2 | 5/2009 |

\* cited by examiner

SURFACE APPEARANCE SIMULATION SYSTEMS AND METHODS

BACKGROUND

The subject matter described herein generally relates to systems and methods for providing improved appearance simulation and/or abrasion resistance for exterior products.

BRIEF SUMMARY

One or more embodiments described herein provide for a system (and method for providing the same) that provides for improved appearance simulation and/or abrasion resistance, for example, for a structural member or members. For example, the system may provide a structural member having a high fidelity wood grain appearance while also having a desirable level of resistance to surface abrasion for use in exterior (or outdoor) applications. One or more embodiments described herein provide for an exterior product having a realistic simulated wood grain appearance.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
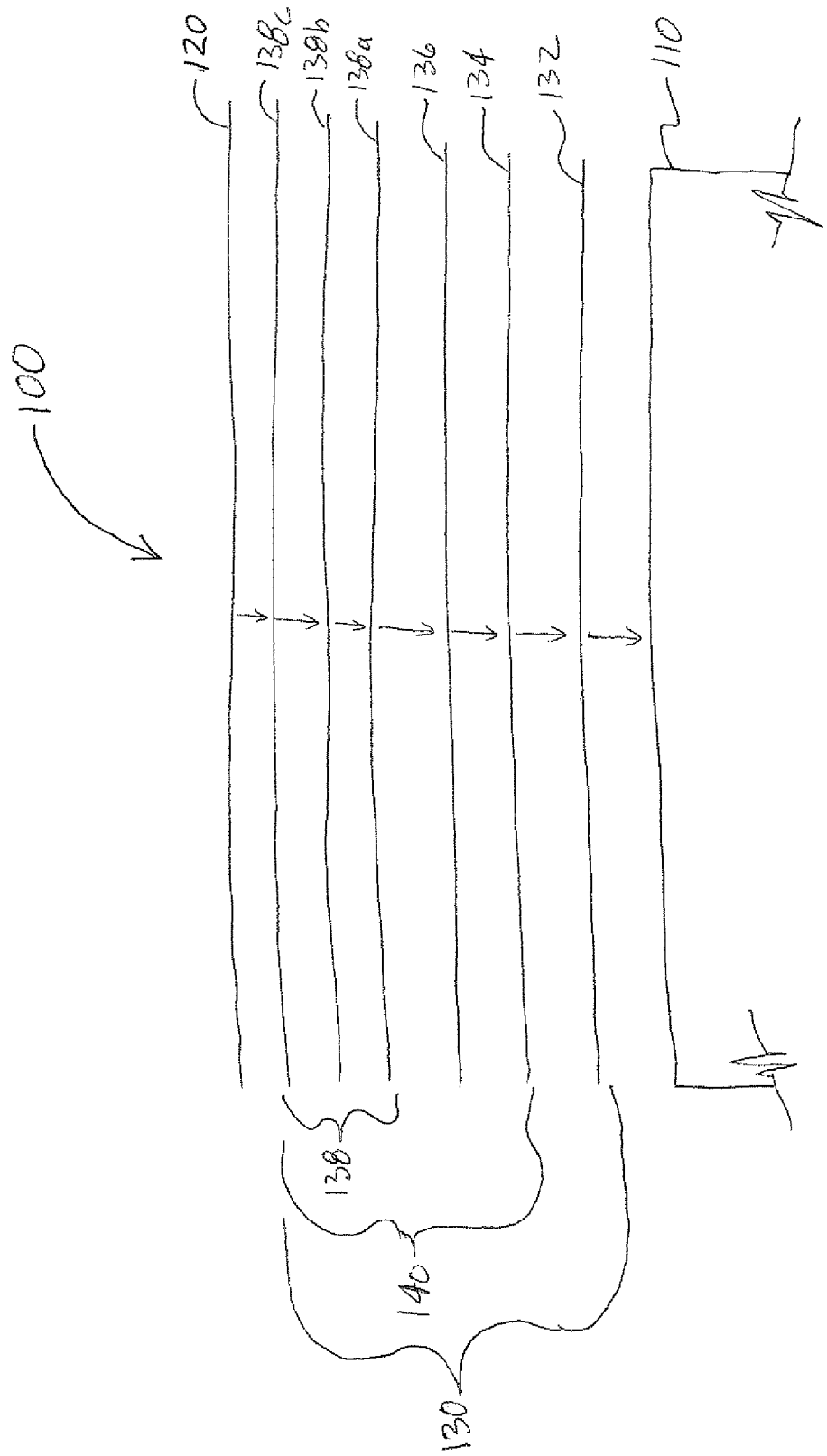
FIG. 1 is a schematic view of one embodiment of a simulated wood product.

In accordance with one or more embodiments described herein, a structural member coating system, method for coating structural member, and coated structural members having a realistic simulated appearance are disclosed.

Embodiments provide for high quality graphics in conjunction with exterior durable materials for outdoor applications. Embodiments provide enhanced appearance and/or other attributes (e.g., durability) for structural members for exterior or outdoor applications. A structural member including a substrate having plural intermediate layers configured to provide a simulated appearance and a top coat configured to provide desirable features for exterior use may be provided. For example, a natural product (e.g., wood having a grain) may be simulated using a man-made material (e.g., plastic, composite, or the like) having performance features desirable in outdoor applications (e.g., resistance to the elements including sunlight, resistivity to abrasion, or the like). Such features may be particularly desirable in horizontal applications (such as decking or other surface across which foot traffic is expected), as well as various challenging vertical or other non-horizontal applications (such as garage doors or roofing) that may be subject to a substantial level of abuse over an expected life cycle. Structural members in accordance with various embodiments may be employed as building materials such as decking, fencing, wall panels, roofing, doors, trim, or the like. In some embodiments, Polyvinyl Chloride (PVC), Acrylonitrile Butadiene Styrene (ABS), other exterior grade plastics or composites, or the like may be employed as a substrate to which a coating is applied.

Exterior building materials may vary in appearance by one or more of substrate color, design, pattern, or decorative effects. The appearance and design of exterior building materials may be limited by product specifications, requirements, or performance needs. Performance targets, needs, or requirements may include for example, ultraviolet (UV) durability, or the ability to resist color fade, chalking, cracking, blistering, or the like due to exposure from UV radiation (e.g., from sunlight), and/or resist wear or damage from weather conditions, such as changing temperatures, precipitation, or the like. As another example, performance targets, needs, or requirements may include long term wear, including abrasion resistance from foot traffic, contact with plants, trees, or shrubs, wind abrasion from air borne dirt or debris, or the like. As yet another example, performance targets, needs, or requirements may include short term wear, or resistance to scratches or impacts. As still another example, performance targets, needs, or requirements may include chemical or stain resistance or tolerance, such as tolerance of or resistance to general cleaning chemicals, lawn care products, insecticides, general household items, or the like. As one more example, performance targets, needs, or requirements may include installation and storage characteristics. For instance, exterior building materials should be robust enough for handling by contractors, home owners, or other individuals. Various embodiments provide for desired characteristics for exterior applications, such as the characteristics discussed above.

As indicated above, structural members formed in accordance with various embodiments may be used in horizontal or vertical (or other non-horizontal orientation such as slanted) applications. Desired performance characteristics for horizontal applications may differ from desired performance characteristics for vertical (or other non-horizontal) applications. For example, a deck plank may be considered in comparison to a wall panel. The deck plank may require durability from foot traffic that a wall panel would not. Various conventional exterior building products currently available may suffer from limited design capability due to process limitation or durability requirements for a particular application. Such limitations may be particularly evident in applications where the product is oriented horizontally and may be walked upon. For example, in the decking industry, plastic or composite deck planks may be decorated in a variety of ways to attempt to simulate a wood appearance. One challenge facing these applications is to create a realistic appearance while maintaining durability characteristics to withstand foot traffic (e.g., walking, running, pet traffic, or the like), weather/environment factors (UV, moisture, wind, rain, mold, temperature change, or the like), and general considerations (e.g., pool or spa chemicals, household cleaners, yard maintenance materials such as insecticides or fertilizers, or the like).

Conventionally, materials used to simulate wood grain appearance for exterior applications may be made based on wood or wood composites originally configured for interior applications. While such materials may have relatively good graphic images and may provide wear resistance, such material (e.g., wood substrates) may not hold up to exterior conditions (e.g., effects of weather experience in exterior applications). For example, decorated surfaces configured to simulate a wood grain for interior applications may include paper in conjunction with highly cross-linked polymer coatings. Such surfaces may not move sufficiently with the normal or expected thermal expansion or contraction of a plastic or plastic composite substrate in an exterior application, which may lead to delamination of the decorative surface. Various previous attempts to simulate real wood (e.g., wood grain), for example as part of a plastic or composite substrate, have not produced results as effective as may be desired.

For example, macro embossing has been attempted to provide a textured effect to simulate cathedrals or other grains in a wood species. Macro embossing, however, does not provide a realistic wood grain simulation, instead resembling a piece of textured plastic. Further, macro embossing may be limited typically to solid colors, but may have streaks of pigment or prints in some applications.

As another example, variegation has been attempted using a color effect within an extruded part, such as via the use of different color pellets dropped into an extrusion process. However, variegation also provides a poor simulation of wood grain, instead resembling a streaked plastic part which may or may not be textured. These and other attempted techniques have achieved less than desirable results, for example, by providing poor simulation and/or failing to provide durability required for outdoor use.

Embodiments disclosed herein provide systems and/or methods for providing improved graphical simulation with durability properties configured for outdoor use. For example, a decoration may be provided using a transfer decoration (e.g., glued, thermally transferred, or the like) that provides a polymer and pigment combination that eliminates or reduces fading or degradation during an exterior product lifetime. A clear topcoat may be used in conjunction with the transfer decoration to provide one or more of wear resistance, weather resistance, or anti-slip resistance. Further, one or more of stain resistance, chemical resistance, solvent-resistance, or graffiti resistance may be provided.

For example, in embodiments, one or more layers may be employed to provide a transfer decoration that realistically simulates a desired appearance. The desired appearance may be one or more of a variety of appearances. For example, a naturally occurring appearance, such as wood, stone, ceramic, or the like may be simulated. Additionally or alternatively, a graphic image, such as a pattern (e.g., camouflage), a synthetic design, a logo, or the like may be simulated.

In some embodiments, a base or "last down" layer may be included, and be configured to facilitate bonding to a substrate or laminating adhesive. A ground coat may be included. The ground coat may provide overall background color and/or protect the substrate from UV light. Further, a graphic image may be provided. In embodiments, the graphic image may include two or more corresponding printed images that are laid down to provide a desired graphic appearance. In some embodiments, the ground coat and the graphic image may utilize inorganic oxide, complex inorganic colored pigment (CICP), exterior durable organic pigment, or the like. In various embodiments, a topcoat bonding coat may be provided, with the topcoat bonding coat configured to facilitate the bonding of the topcoat to the transfer decoration. The various layers (or materials used in the various layers) may cooperate together to provide high-quality materials that are configured to be durable for outdoor applications while still providing aesthetically pleasing graphics.

FIG. 1 is a side view of a simulated wood product 100 made from a plurality of layers that may be added or applied to a substrate in accordance with an embodiment. It should be noted that FIG. 1 is a schematic, conceptual depiction and is not intended to be to scale. Different layers may have varying thicknesses in various embodiments. In some embodiments, more layers of a given type, less layers of a given type, more types of layers, and/or less types of layers may be employed. For example, a given layer depicted in FIG. 1 may not be present in various embodiments, and/or a layer not depicted in FIG. 1 may be present in various embodiments. Further, the illustrated embodiment is discussed in the context of simulated wood grain, but other simulation may be achieved in other embodiments. For example, other natural materials such as stone, ceramic, tile, or the like may be simulated. Further, graphic images such as patterns, designs, logos, or the like may be provided in embodiments.

The simulated wood product 100 depicted in FIG. 1 includes an intermediate portion 130 including a plurality of intermediate layers 132, 134, 136, 138 disposed between a substrate 110 and a top coat 120. The substrate 110 and/or one or more of the layers of the intermediate portion 130 and/or the top coat 120 may be comprised of durable exterior components. For example, the top coat 120 may have a durable formulation including inorganic particles. In some embodiments, the top coat 120 may be a relatively thin coating with a relatively lightly textured surface for slip and durability enhancement. The intermediate portion 130 may provide a realistic simulation of a cathedral or other wood grain pattern that appears close to the surface (e.g., covered only by the relatively thin top coat 120) and/or having a layered or three-dimensional appearance. Cathedral grain may be understood as a specific grain pattern characterized by a series of stacked "V" and/or inverted "V" shapes. This pattern is common to flat cut or plain sliced veneer. Other grain patterns may be simulated additionally or alternatively in various embodiments. In FIG. 1, the various layers are depicted only on top of the substrate 110, but layers could be applied to the sides and/or bottom of the substrate 110 as well in various embodiments. (See, e.g., FIG. 2)

Returning to FIG. 1, the substrate 110 may be a structural member such as a plank, board, beam, sheet, or the like. In the illustrated embodiment, the substrate 110 is a plank sized and configured to be used for decking, and a number of such planks may be used to provide the surface of a deck upon which people may walk, stand, sit, or the like. The substrate 110 may be provided in one or more predetermined lengths. In some embodiments, the substrate may be plastic or composite. Generally speaking, the substrate 110 is configured to provide the structural strength, rigidity, and/or other properties that may be required or desired for the simulated wood product 100. The various layers and top coat 120 are provided over one or more surfaces of the substrate 110 to provide a realistic wood grain appearance to the simulated wood product 100.

In the illustrated embodiment, the intermediate portion 130 is configured to provide a realistic simulation of a wood material, for example a wood grain. The intermediate portion 130 includes a plurality of layers (e.g., a visual effect simulation portion 140) that cooperate to provide a wood-like appearance. By "cooperate," it is meant that a visual design or appearance on each of the plurality of layers is based on the visual design or appearance on one or more, or all, of the other layers in the plurality of layers. For example, the spatial location of the design, the arrangement of two or more designs, the spacing between designs, and the like, on a first layer may be created in order to be oriented in a designated or preselected relationship with the design or appearance of one or more other designs on a second layer (and/or on multiple other layers). The designs on the plurality of layers can be arranged relative to each other such that, when the layers are stacked on top of one another, a composite design is created. The composite design may be a mixture or other combination of the different designs on the different layers, and may be different from the designs of one or more, or all, of the layers in the plurality of layers. In an embodiment, the designs on the layers do not physically or chemically mix with each other, but remain separate to provide the composite design.

The intermediate portion also includes an adhesive layer 132 configured to help secure the intermediate portion 130 to the substrate 110. The intermediate portion 130 thus may be seen as an including an adhesive layer 132 as well as the visual effect simulation portion 140. The use of layers, for example, as depicted in FIG. 1, may provide realistic simulation of wood grain, allowing for the appearance of visual depth to provide a realistic simulation of wood grain. It should be noted that a given layer depicted as an individual layer in FIG. 1 may be achieved or replaced by multiple layers or sublayers. In various embodiments, various layers may be applied sequentially to a substrate (e.g., one or more lower layers applied first, one or more intermediate layers then applied after the one or more lower layers, and one or more upper layers then applied after the one or more intermediate layers). In other embodiments, the intermediate portion 130 may be applied at a single time, with the various layers arranged, for example, as a foil that is applied to the substrate 110. In still other embodiments, for example, the adhesive layer 132 may first be applied, with the visual effect simulation portion 140 subsequently applied as a foil. In various embodiments one or more foils (with each foil comprising a plurality of layers may be applied. For example, all or some of the layers of the visual effect simulation portion 140 may be provided as a foil. As another example, the entire intermediate portion 130 may be provided as a foil.

The adhesive layer 132 is the portion of layer of the intermediate portion 130 in the illustrated embodiment that is positioned most closely to a surface of the substrate 110. The adhesive layer is configured to adhere, bond, secure, or the like the various other layers to the substrate 110. The adhesive layer 132 for example, may be a liquid. A liquid adhesive layer may be applied to the substrate, for example, by a coating or spraying operation. In some embodiments, the adhesive layer 132 may be heat activated and thermally applied. In some embodiments, the adhesive layer 132 may be applied before any other layers of the intermediate portion 130, while in other embodiments, the adhesive layer 132 may be applied at the same time as one or more additional layers, for example as a foil comprising multiple layers that is applied to the substrate 110, with the adhesive layer 132 of the foil oriented most closely toward the surface of the substrate 110 to which the foil is to be applied. The adhesive layer 132 may be configured to act as a primer layer for the visual effect simulation portion 140 or a layer thereof. In some embodiments, a primer layer may be positioned or applied above the adhesive layer 132.

The visual effect simulation portion 140 includes layers that are configured to cooperate with each other to provide a simulation of wood grain. One or more layers may have patterns that are configured to coordinate or otherwise correspond with patterns of one or more other layers, for example, with various portions of a grain pattern provided by different layers. In some embodiments, a leading edge of a grain may be provided by a first layer, an intermediate portion of the grain provided by a second layer, and a trailing edge of a grain provided by a third layer. Alternatively or additionally, varying shadings between portions of a grain pattern may be provided by a plurality of layers.

One or more of the layers may be substantially solid in shade or color, for example, to provide a base color to the wood simulation. One or more layers that include a pattern may be applied above the substantially solidly colored layers. Layers that include a pattern may be partially or fully transparent or translucent allowing patterns from layers disposed beneath to show through the given layer, so that the layers can provide visual depth or have a three-dimensional appearance. For example, an undertone or base color may be provided with varying patterns of grain imposed on top. Such a layered grain simulation may provide a more realistic simulation of wood grain than approaches using lines, streaking, or the like drawn or otherwise formed in an attempt to provide a profile or outline of wood grain. The visual effect simulation portion 140 may be formed as a foil and applied together (with or without the adhesive layer 132). The visual effect simulation portion 140 may include one or more foils and be applied in one or more steps. The visual effect simulation portion 140 may be applied at the same time as the adhesive layer 132 in some embodiments, and may be applied subsequent to the adhesive layer 132 in other embodiments. The visual effect simulation portion 140 in the illustrated embodiment includes a ground coat layer 134, a print undertone layer 136, and a print layer 138.

The ground coat layer 134 in the illustrated embodiment is configured for exterior use and configured for durability. The ground coat layer 134 in the illustrated embodiment is positioned or applied above the adhesive layer 132 (e.g., with the adhesive layer 132 interposed between the substrate 110 and the ground coat layer 134.) In some embodiments, a primer layer (not shown in FIG. 1) may be interposed between the adhesive layer 132 and the ground coat layer 134. The ground coat layer 134 of the illustrated embodiment provides a base for additional layers of the visual effect simulation portion. The ground coat layer 134 may be the same color or a different color than the print undertone layer 136.

The print undertone layer 136 in the illustrated embodiment is positioned above the ground coat layer 134 (e.g., with the ground coat layer 134 interposed between the print undertone layer 136 and the substrate 110). In the depicted embodiment, the print undertone layer 136 is configured for exterior use and configured for durability. In various embodiments, the print undertone layer 136 may be the same color or shade as the ground coat layer 134, or may be a different color or shade than the ground coat layer 134 (e.g., the print undertone layer 136 may be a lighter shade or color than the ground coat layer 134). In some embodiments, the print undertone layer may be translucent or have variable translucence to allow a portion of the ground coat layer 134 to appear through the print undertone layer. In other embodiments, the print undertone layer may be substantially opaque and not allow substantial visual appearance of any portion of the ground coat layer 134. Generally, in various embodiments, the print undertone layer 136 may be selected or configured to simulate a base color of a given type or variety of wood (e.g., maple, pine, cedar, redwood, or the like). In some embodiments, the print undertone layer 136 may be lighter in color than portions of the print layer 138 (or sub-layers forming the print layer 138) to allow the appearance of darker grain patterns over a lighter base color. In some embodiments, the print undertone layer 136 may be substantially uniform in color or shade distribution, while in other embodiments, the print undertone layer 136 may have variance or gradation of shade.

The print layer 138 may include a plurality of sublayers (e.g., from 3-10 sublayers) configured to provide a realistic layered depth effect. The print layer 138 in the illustrated embodiment is configured to be durable for exterior use, and configured to provide a high fidelity print simulation. For example, the print layer 138 may be configured to provide a realistic wood grain appearance over the print undertone layer 136. One or more layers of the print layer 138 in the illustrated embodiment are partially translucent or transparent to allow at least a portion of a layer or sublayer therebeneath to be perceived by viewer. For example, a portion of a sublayer configured to simulate a grain pattern or portion of a grain pattern may be substantially opaque while other portions of the sublayer may be translucent or transparent. The print layer 138 may be formed of one or more pre-printed sheets or foils that are configured to have corresponding fiducial points that correspond with points of other layers, with the various layers cooperating to provide a simulated appearance. For example, each of a plurality of layers or sublayers may contribute a discrete portion of an overall pattern (such as a wood grain), with the contributions of the various layers or sublayers aligned to provide a unified effect when the layers are applied together. Thus, various portions of a grain pattern may be lighter or darker and/or have the appearance of varying depth relative to other portions of a grain pattern provided on other layers or sublayers.

For example, some portions of a grain pattern may be lighter (and/or be underneath one or more translucent layers) while other portions may darker (and/or above other layers). For example, one layer may be used to provide an interior portion of a grain (e.g. quilt, flame, burr, knot, or the like) and may be relatively dark, and a corresponding edge of the grain (e.g., an outer portion of a knot, a ring, or the like) may be lighter. As another example, one edge of a grain pattern may be darker and one edge lighter. Further, multiple layers may cooperate to provide additional shadings between portions of a grain pattern and/or additional depth layers of a grain pattern. Thus, multiple layers or sublayers may be employed to provide variations in shade and/or depth to provide a realistic simulation of wood grain.

Figure 3:
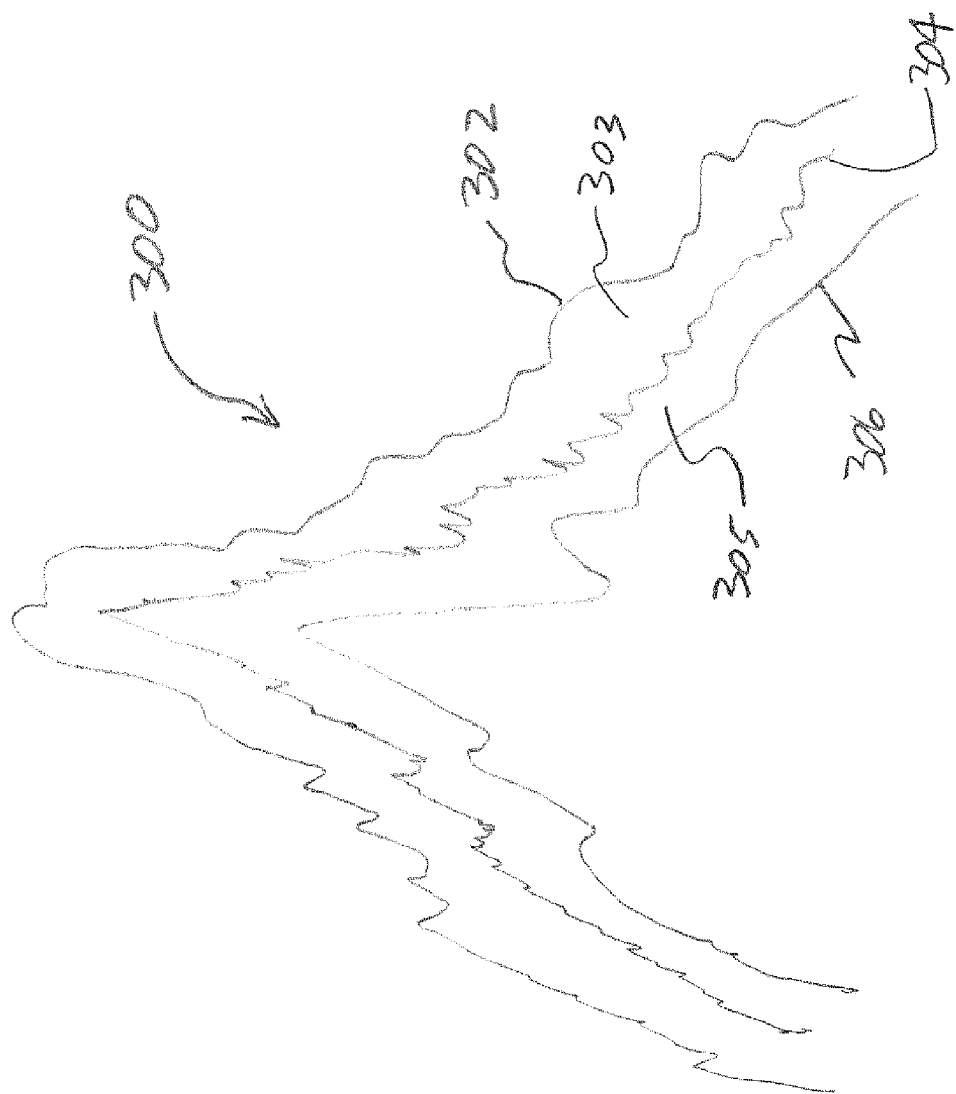
FIG. 3 is a view of a simulated wood grain of one embodiment.

In the illustrated embodiment, the print layer 138 includes sublayers 138a, 138b, 138c. 3 sublayers are shown in the illustrated embodiment; however, more or less sublayers may be employed in other embodiments. FIG. 3 provides one example of a grain pattern that may be provided by various sublayers. In FIG. 3, a cathedral grain pattern 300 is provided having three grain portions, namely a leading edge 302, an intermediate portion 304, and a trailing edge 306. The various grain portions (and/or areas 303, 305 disposed between grain portions) may have various shadings and depth appearances provided by use of different layers. For example, the leading edge 302 may be provided by a grain pattern included on the sublayer 138a, the intermediate portion 304 may be provided by a grain pattern included on the sublayer 138b, and the trailing edge 306 may be provided by a grain pattern included on the sublayer 138c. In various embodiments, more than one grain pattern may be provided by a given sublayer (e.g. one sublayer may provide both the leading edge 302 and the trailing edge 306). Thus, in the illustrated embodiment, the various grain portions 302, 304, 306 (and/or areas between or near the various grain patterns) may have differing apparent depths, provide a realistic depth to the simulated wood grain.

Alternatively or additionally, sublayers may cooperate to provide a given grain pattern (e.g., one or more sublayers may cooperate to provide the intermediate portion 304. In the embodiment depicted in FIG. 3, the various sublayers are coordinated so that the various grain patterns are positioned in locations corresponding to one another, so that the "V"s formed by the various layers are positioned a desired spacing apart from one another and do not overlap or cancel one another out. In various embodiments, other grain patterns may be simulated (e.g., quartersawn, flame, quilt, or the like).

Returning to FIG. 1, the top coat 120 is disposed above the intermediate portion 130 (e.g., with the intermediate portion 130 interposed between the top coat 120 and the substrate 110. The top coat 120 of the illustrated embodiment is relatively thin (e.g., having a relatively low thickness configured to allow the grain simulation to appear close to the surface of the simulated wood product 100) and is configured for use with exterior applications. In an embodiment, the top coat 120 is relatively thin when a thickness dimension of the top coat 120 is smaller than the thicknesses of all other layers and portions of the structure. The top coat 120 may be configured to provide good abrasion resistance as well as UV resistance (e.g., resistance to fading of the print layers due to exposure to sunlight. The top coat 120 may include a base member configured for UV resistance and an additive configured to provide abrasion resistance. The top coat 120 may be substantially thinner than plastic caps used in some alternate approaches.

The base member of the top coat 120 may be formed using a polymer. For example, in various embodiments, one or more of a urethane, acrylic, fluoropolymer, or other exterior durable polymer system may be employed, for example, to provide light stability. The base member may include one or more functional groups, for example, to crosslink the top coat in order to improve certain properties. As one example, the base member may include a hydroxal functional group to crosslink with urethane or melamine containing materials. As another example, the base member may include a carboxal functional group to crosslink with aziradine or oxazolidine containing materials. As still another example, the base member may include a free radical functional group to crosslink, for instance, using UV or E beam radiation. As yet another example, the base member may include a cycloalphatic epoxy functional to crosslink, for instance, using UV or E beam radiation. In various embodiments, the base member may be water based or 100% solids to minimize hazardous organic volatiles.

As indicated above the top coat may also include an additive that is added to (e.g., disposed within) the base member. The additive may include, for example, inorganic particles. The inorganic particles may be configured to improve abrasion resistance and/or provide anti-slip properties. In embodiments, the additive may include particles having a hardness of about 5 MOL or above. In various embodiments, the additive may have a low refractive index to help maximize clarity of the top coat 120. For example, the additive may have a refractive index of about 2.2 or lower. The thickness of the additive (e.g., particle size) may be configured such that the thickness is about 140% or less of the thickness of the base member.

The thickness of the top coat 120 (e.g., the thickness of the base member of the top coat 120) may be determined based on wear requirements of a given application of an end product utilizing the top coat 120. For example, in some embodiments, a thickness of about 0.5 mil or above may be utilized to provide a desired level of wear resistance. In some embodiments, multiple coats may be applied to achieve a desired thickness. Further, in some embodiments, the composition of the multiple coats may vary to achieve a desired property. For example a first coat or layer of the top coat 120 may have a first composition, and a subsequently applied coat or layer may have a different composition.

The top coat 120, for example, may be sprayed, curtain coated, or the like above the intermediate portion 130 after the intermediate portion 130 has been applied to the substrate. In some embodiments, the base may include a fluoropolymer. The fluoropolymer, for example, may be Polyvinylidene Fluoride (PVDF). The additive may include inorganic particles. The additive may include, for example, Aluminum Oxide ($Al_2O_3$). The inorganic particles may be sized and distributed in the base member for a particular application. For example, the particles may be sized and provided in a relative proportion relative to the thickness of the top coat 120 such that at least some portions of the particles provide an irregular surface to the top coat 120, providing for a level of grip to one or more exterior surfaces of the simulated wood product as well as abrasion resistance. The additive may include particles having a size, and the thickness of the top coat 120 and the size of the particles may be configured to provide a texture. For example, as indicated above, in some embodiments, the particle size may be about 140% of the thickness of the base member or less. As another example, in some embodiments, the particle size may be selected from a range between about 50% to about 125% of the thickness of the base member. A texture of the top coat 120 may be understood as a tactilely perceptible non-uniform surface. The top coat 120 may have a thickness configured to cooperate with the particle size of the additive to provide for slip resistance (e.g., for people walking on a deck, flooring, walkway, or other surface made with the simulated wood product 100). In various embodiments, the top coat 120 may be disposed above a top, sides, and/or bottom of the substrate 110.

As indicated above, the top coat 120 may be applied by coating. For example, the top coat 120 may be roll coated, curtain or side coated, spray coated, or the like. In some alternative embodiments, a film could be glued or otherwise applied to a graphic image to provide the top coat 120. The film, for example, may be surface modified to provide one or more of a lower gloss, anti-slip characteristics, or abrasion resistance. The film may be composed of an exterior durable polymer (e.g., acrylic, polycarbonate, urethane, or the like). In various embodiments, the film may have a thickness between about 2 mil and about 5 mil. The glue or adhesive may be a single component reactive urethane, or as another example, a two component urethane. The glue or adhesive may be light stable, and may be applied at a thickness configured to provide excellent adhesion between the film and a decorative graphic.

In connection with FIG. 1, a simulated wood product 100 is discussed. In various embodiments, other materials (either natural or man-made) may be simulated, such as stone, stucco, plaster, or the like. A simulated appearance as discussed herein may be understood as an appearance configured to appear different than a natural appearance of a substrate in terms of pattern, texture, or the like. In various embodiments, such a simulated appearance may be achieve via a plurality of partially transparent or translucent layers configured to provide a layered or three-dimensional effect. Patterns of grain or other simulation may be provided having a relatively repetitive appearance in some embodiments, while a random appearance may be employed in other embodiments.

Figure 2:
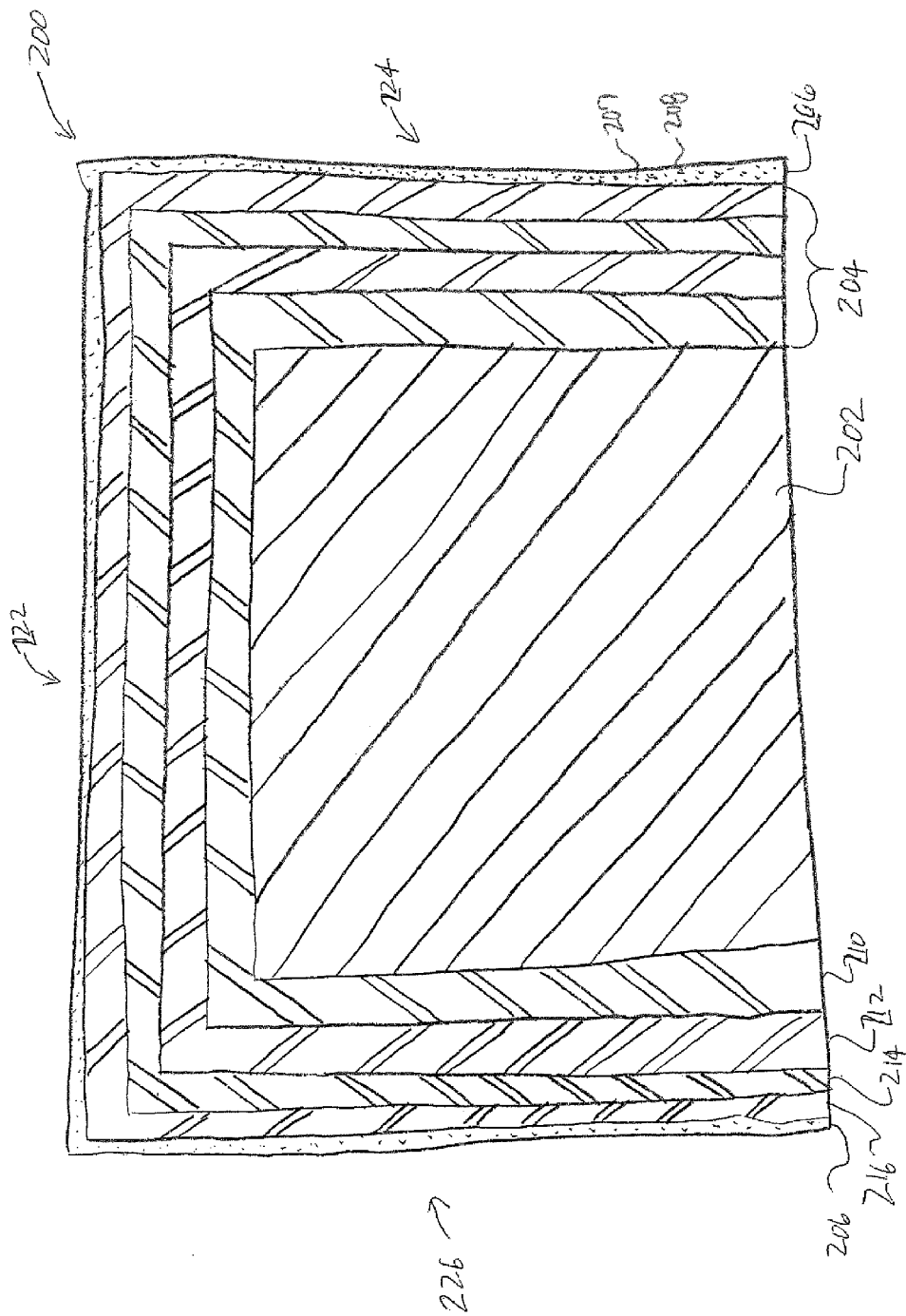
FIG. 2 is overhead sectional view of a portion of one embodiment of a simulated wood product.

FIG. 2 is a side view of a simulated wood product 200 including a plurality of layers that have been applied or added to a substrate 202. It should be noted that the thicknesses of various layers in FIG. 2 are provided for clarity of illustration and are not intended as a scale representation. For example, one or more layers may be relatively thinner with respect to other layers and/or the substrate. In various embodiments, varying types of layers and/or numbers of layers or sub-layers may be employed. Further, more or less layers or of a given type of layer may be employed.

The simulated wood product 200 includes a substrate 202, intermediate layers 204, and a top coat 206. The intermediate layers 204 are interposed between the substrate 202 and the top coat 206. At least some of the intermediate layers 204 are configured to provide a simulated visual effect, such as to simulate wood grain. The top coat 206 may be configured similarly to the top coat 120 discussed above, and may be configured to provide both UV and abrasion resistance.

The simulated wood product 200 includes a top 222, a bottom 220, a first side 224 and a second side 226. In the illustrated embodiment, the top 222 is configured to be oriented in an outward position relative to the bottom 220. For example, if the simulated wood product 200 were to be used a horizontal application, such as being utilized as a plank of a deck, the simulated wood product 200 is configured so that the top 222 would be facing outward, e.g., as the surface upon which a person traversing the deck would walk. As another example, if the simulated wood product 200 were to be used in a non-horizontal application, such as a garage door, the simulated wood product is configured so that the top 222 would be facing outward (e.g., the bottom 224 positioned more proximate the interior of the garage). In still other embodiments, the simulated wood product 200 may be positioned so that both the top 222 and bottom 220 are configured as facing outward, for example as part of a back rest of a bench that may be formed as part of the deck, and both the top 222 and bottom 220 may be provided with a simulated wood grain.

In the embodiment depicted in FIG. 2, the intermediate layers 204 and the top coat 206 are shown as covering the top 222, the first side 224, and the second side 226. In various embodiments, different arrangements may be employed. As one example, the intermediate layers 204 and top coat 206 may be applied only above or along the top 222. As another example, the top coat 206 may be applied over a larger area than the intermediate layers 204. For example, the intermediate layers 204 may be applied only along the top 222, while the top coat 206 may be applied along the top 222 and one or more of the first side 224 or the second side 226. As still another example, the intermediate layers 204 and top coat 206 may be provided along the entire periphery of the substrate 202 (e.g., along the top 222, first side 224, bottom 220, and second side 226). In such an arrangement, any surface of the simulated wood product may be considered as or employed as a top or outer surface.

The substrate 202 may be similar in respects to the substrate 110 discussed above in connection with FIG. 1. For example, the substrate 202 may be a structural member such as a plank, board, beam, sheet, or the like. In some embodiments, the substrate 202 may be formed from one or more plastic or composite materials. Generally speaking, the substrate 202 is configured to provide a desired strength, rigidity, and/or other properties for a given exterior application. The various layers and the top coat 206 are provided over one or more surfaces of the substrate 202 to provide a realistic wood grain appearance as well as desired additional properties such as UV resistance, resistance to chemicals (such as cleaners, fertilizers, or the like), abrasion resistance, slip resistance, or the like.

The intermediate layers 204 include a plurality of layers (which may in some embodiments in turn include sublayers), and may be configured similarly in certain respects to the intermediate portion 130 discussed above in connection with FIG. 1. One or more of the intermediate layers 204 may be applied to the substrate 202 at the same time. In some embodiments, one or more of the intermediate layers 204 may be applied to the substrate at a different time than one or more others of the intermediate layers 204. In the illustrated embodiments, the intermediate layers 204 are configured to provide a realistic simulation of a wood material, for example a wood grain. It should be noted that a given layer depicted as an individual layer in FIG. 2 may be achieved or replaced by multiple layers or sublayers.

The adhesive layer 210 may be similar in certain respects to the adhesive layer 132 discussed in connection with FIG. 1. For example, generally, the adhesive layer is configured to adhere, bond, secure, or the like the various other layers to the substrate 202. The adhesive layer 210 in some embodiments may be a liquid. In some embodiments, the adhesive layer 210 may be heat activated and thermally applied, for example as a foil or as an exterior layer of a foil.

The ground layer 212 may be similar in certain respects to the ground coat layer 134 discussed in connection with FIG. 1. Generally, the ground coat 212 of the illustrated embodiment is configured to provide a base for additional layers positioned above (e.g., farther from an exterior surface of the substrate 202). The ground coat 212 may be the same color or a different color than the print undertone layer 214.

The print undertone layer 214 may be configured similarly in certain respects to the print undertone layer 136 discussed in connection with FIG. 1. For example, the print undertone layer 214 may be translucent or have variable translucence to allow a portion of the ground coat layer 212 to appear through the print undertone layer 214, while in other embodiments, the print undertone layer 214 may be substantially opaque. The print undertone layer 136 may be selected or configured to simulate a base color of a given type or variety of wood. The print undertone layer may be substantially uniform in color or shade distribution, or may have variance or gradation of shade.

The print layer 216 may be configured similarly to the print layer 138 discussed above in connection with FIG. 1. For example, the print layer 216 may include a plurality of sublayers (not shown in FIG. 2) configured to provide a realistic layered depth effect. The print layer 216 may be formed of one or more pre-printed sheets or foils that are configured to have corresponding patterns or sub-patterns that cooperate with each other to form a coordinated pattern, such as a wood grain pattern, that includes contributions from a plurality of layers. Thus, various portions of a grain pattern may be lighter or darker and/or have the appearance of varying depth relative to other portions of a grain pattern.

The top coat 206 may be configured similarly in certain respect to the top coat 120 discussed above in connection with FIG. 1. For example, the top coat 206 depicted in FIG. 2 is configured to be relatively thin (e.g., having a relatively low thickness configured to allow the grain simulation to appear close to the surface of the simulated wood product 200), and is configured for use with exterior applications. In the illustrated embodiment, the top coat 206 includes a base member 207 configured for UV resistance and an additive 208 configured to provide abrasion resistance. In some embodiments, the base member 207 may include a fluoropolymer, such as PVDF. The additive 208 may include inorganic particles, for example, including Aluminum Oxide ($Al_2O_3$).

Figure 4:
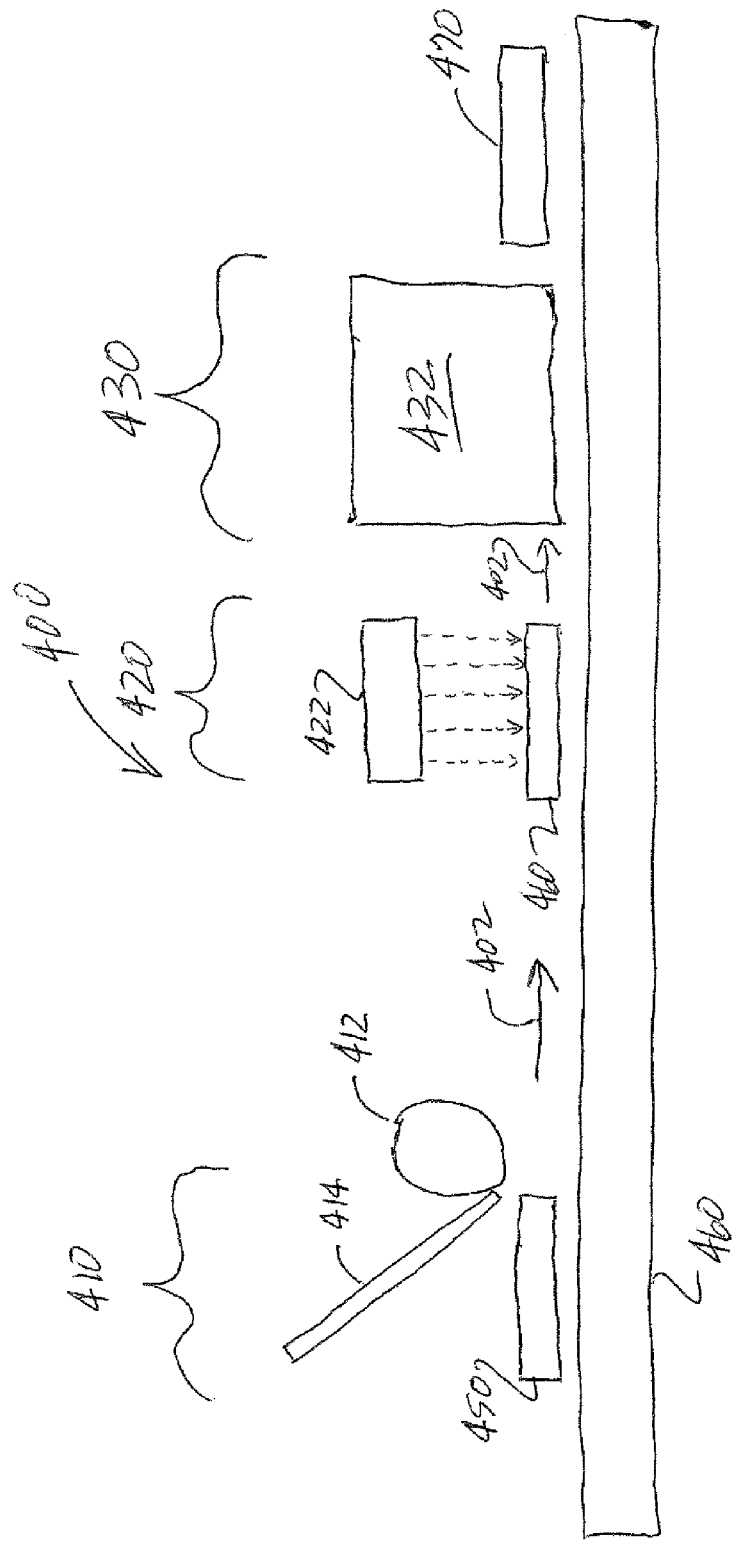
FIG. 4 is a schematic view of a coating system in accordance with an embodiment.

FIG. 4 is a schematic view of a system 400 configured to provide a simulated wood product, such as the simulated wood product 100 or the simulated wood product 200 discussed above. The various zones or stations of the system 400 are joined by a transport mechanism such as the substrate transport 440. The substrate transport 440 may be configured, for example, as a conveyor belt or the like. The various zones may be part of one generally continuous line disposed at a single generally contiguous location or facility, or alternatively may be configured as two or more separate lines located remotely at one or more facilities.

The system 400 includes a first zone 410, a second zone 420, and a third zone 430 linked by the substrate transport 440. In the illustrated embodiment, the first zone 410 is configured as a decorating zone or station configured to add an adhesive as well as a visual simulation effect (e.g., wood grain) portion that may include a plurality of layers (e.g., base coat, undertone, print layer). The second zone 420 may be configured as a top coat application zone or station, and the third zone 430 may be configured as a drying and/or curing zone or station configured to dry or cure the top coat that has been applied to the substrate. In various embodiments, each zone depicted in FIG. 4 may be broken into a plurality of zones or sub-zones (e.g., multiple zones for adding an adhesive layer separately from other layers, adding decorative layers sequentially, or the like) and/or additional zones, stations, or processes may be employed.

In the illustrated embodiment, the first zone 410 is configured to receive a substrate 450 (e.g., a substrate such as the substrate 110 or the substrate 202 discussed elsewhere herein) conveyed by the substrate transport 440, and to apply an exterior foil 414 that is configured to provide a visual simulation (e.g., a wood grain simulation) to the substrate 450. In the illustrated embodiment, the first zone 410 is configured as an intermediate coating station configured to apply plural intermediate layers to the substrate 450. The exterior foil 414 may include a plurality of intermediate layers as discussed elsewhere herein and may be laminated or transferred to the substrate 450 using heat activated adhesive in some embodiments, and may be wet applied in other embodiments. In the illustrated embodiment, the first zone 410 includes a pressure roller 412 configured to apply the exterior foil 414 to one or more surfaces of the substrate 450 to provide a decorated substrate 460. The roller pressure may be applied at various angles to cover all surfaces of the substrate 460 that require decoration. In some embodiments multiple rollers may be employed (e.g., a first roller to apply a foil to the top of a substrate and a second roller to apply a foil to the side of a substrate). A single foil may be applied to more than one surface of the substrate, or each surface of the substrate to receive a decoration may receive a foil sized and configured for that particular surface. In alternate embodiments, an adhesive and/or primer layer may be applied initially before other layers, and/or one or more layers may be applied sequentially using a plurality of zones or sub-zones. In the illustrated embodiment, after the exterior foil 414 is applied to the substrate 450 to provide a decorated substrate 460, the decorated substrate 460 is advanced in direction 402 to the second zone 420.

At the second zone 420, the decorated substrate 460 receives a top coat (e.g., top coat 120, top coat 206). In the illustrated embodiment, the second zone 420 includes a spraying station 422 configured to spray the top coat onto the decorated substrate 460. In alternate embodiments, the second zone 420 may be configured to coat the decorated substrate 460 using a curtain coating process or other coating process. In various embodiments, the top coat may be applied to a single surface of the decorated substrate 460 (e.g., the top) or multiple surfaces of the decorated substrate 460 (e.g., top and sides; top, bottom, and sides). The second zone 420 is configured to apply the top coat as a relatively thin coating or layer that allows for the grain pattern provided by the intermediate layers to be close to the surface as seen by an observer. The thickness of the top coat and the size of particles added to the top in various embodiments are matched to provide an abrasion resistance required or desired for a given application. After the top coat is applied, the decorated substrate 460 with the top coat applied is advanced in direction 402 to the third zone 430.

The third zone 430 of the depicted embodiment is configured as a drying or curing zone for drying or curing the top coat. The third zone may include a drying or curing station 432 including one or more of a heater, blower, or the like to dry or cure the top coat. The third zone 430 of the illustrated embodiment may be configured to dry or cure the top coat such that an additive of the top coat is locked into position and/or creates a bond to the decorated surfaces of the decorated substrate 460. The additive may be positioned such that a portion of at least some of the particles of the additive are located above the coating surface of the top coat base to allow for texture. Such positioning may create a slip resistant surface, enhance abrasion and long term wear, and/or may enhance short term wear, for example due to scratching or the like. After the drying or curing, the simulated wood product 470, now having a cured or dried top coat above a decorative intermediate portion, may be advanced along direction 402 out of the drying or curing station 422 and cooled before further transport. Once cooled, the simulated wood product 470 is ready for transport to a sales location, distribution location, and/or installation location and is ready for installation and use.

Figure 5:
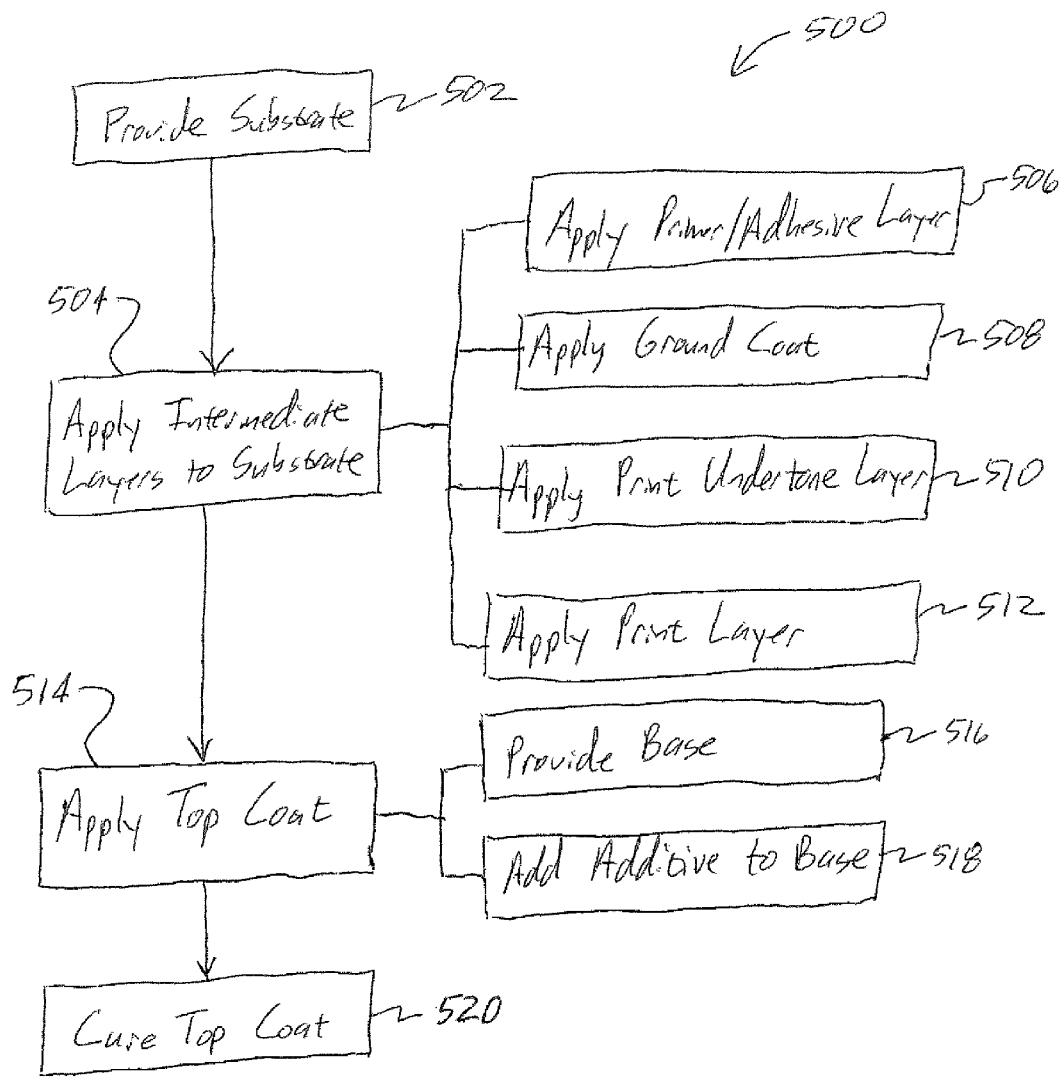
FIG. 5 is a flowchart of one embodiment of a method for providing a simulated wood product.

FIG. 5 is a flowchart of one embodiment of a method 500 for providing a simulated wood product. The method 500 may be used in conjunction, for example, with one or more embodiments of the system 400 shown in FIG. 3 and described herein, and/or used to provide a simulated wood product such as simulated wood product 100 or simulated wood product 200 shown in FIGS. 1 and 2, respectively, and described herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 502, a substrate (e.g., substrate 110 or substrate 202 is provided. The substrate may be configured for use in an exterior application (e.g., decking, roofing, garage door, or the like). A simulated appearance will be applied to the substrate as part of the method 500. In the depicted embodiment, the substrate will be provided with a simulated wood grain appearance.

At 504, intermediate layers are applied to the substrate. One or more of the intermediate layers may be applied sequentially and/or at once. The intermediate layers may be configured to provide a simulated wood grain appearance to the substrate, and may be applied to one or more surfaces of the substrate. The intermediate layers may include sublayers. In the depicted embodiment, the intermediate layers include a primer/adhesive layer, a ground coat layer, a print under tone layer, and a print layer. In some embodiments, the various layers may be combined and provided as a foil including a heat activated adhesive/primer layer that is oriented toward a surface of the substrate, with the foil being thermally applied to the substrate. In the illustrated embodiment, the application of intermediate layers may include a plurality of sub-steps discussed below.

At 506, a primer/adhesive layer (e.g., 132, 210) is applied to one or more surfaces of the substrate. In some embodiments, the primer/adhesive layer may be applied separately to the substrate from the other layers, while in other embodiments the primer/adhesive layer may be provided as an adhesive layer of a foil including one or more additional intermediate layers. In some embodiments, the primer/adhesive layer is a liquid that is wet applied to the substrate, while in other embodiments the primer/adhesive layer may be thermally applied or laminated to the substrate.

At 508 a ground coat (e.g., 134, 212) is applied. In some embodiments, the ground coat may be applied to the adhesive/primer layer as part of forming a foil to be applied to the substrate, while in other embodiments, the ground coat may be applied to an adhesive/primer layer that has already been applied to the substrate.

At 510, a print under tone layer (e.g., 136, 214) is applied. The print under tone layer may include 2 or more sublayers in some embodiments. In various embodiments, the print under tone layer (or one or more sublayers thereof) may be applied to the ground coat layer as part of forming a foil to be applied to the substrate, while in other embodiments, the print under tone layer (or one or more sublayers thereof) may be applied above a ground coat layer that has already been applied to the substrate (e.g., to an adhesive/primer layer previously applied to the substrate).

At 512, a print layer (e.g., 138, 216) is applied. The print layer may include 2 or more sublayers in some embodiments. In various embodiments, the print layer (or one or more sublayers thereof) may be applied to the print under tone layer as part of forming a foil to be applied to the substrate, while in other embodiments, the print layer (or one or more sublayers thereof) may be applied above a print undertone layer that has already been applied to the substrate (e.g., to a ground coat previously applied to the substrate).

At 514 a top coat (e.g, 140, 206) is applied above the print layer. The top coat may be applied by a spraying or coating process above one or more surfaces of a substrate (e.g., above an intermediate layer that has previously been applied to the substrate). The top coat may be configured for exterior use, for example to provide UV resistance to prevent or reduce fading of a print layer due to sunlight. In the illustrated embodiment, the top coat is formed before application by steps 516 and 518.

At 516, a base member (e.g., 207) is provided. The base member, for example, may be UV resistant. The base member, however, may not provide a desired or required slip and/or abrasion resistance for exterior applications such as decking. At 518, an additive (e.g., 208) is added to the base member to, for example, provide improved abrasion resistance. The additive, for example, may include inorganic particles. In the embodiment depicted in FIG. 5, the thickness of the top coat and the size and distribution of the additive are selected to provide a desired slip resistance and/or abrasion or wear resistance.

At 520, the top coat is cured or dried. The top coat may be cured or dried to lock the additive in position within the top coat and create a bond to decorative surface. Particles of the additive may be positioned to provide improved or enhance slip resistance, long term wear resistance, and/or short term wear resistance.

Thus, in various embodiments, a product having a simulated appearance (e.g., wood grain) is provided. The simulated appearance may be provided by a plurality of layers providing a depth to the visual simulation. Further, the simulated appearance product may be provided with a top coat configured to be thin enough to allow the simulated appearance to be close to the outermost surface of the simulated appearance product while still providing desired characteristics (e.g., UV resistance, chemical resistance, wear resistance, slip resistance, or the like) for exterior applications (e.g., decking). For example, embodiments may provide UV durability of 10 or more years of fade and/or chalk resistance. Embodiments may provide long term wear resistance to allow for foot traffic or other performance needs. Embodiments may provide short term wear resistance to allow for increased resistance to scratching or the like. Embodiments may provide chemical and stain resistance from general household chemicals and cleaners. Embodiments may provide for improved ease of installation and storage, for example, as the relatively thin top coat that is permanently bonded to the decorative layers may eliminate or reduce separation of a top layer due to part flexure, expansion or contraction (e.g., due to temperature fluctuations experienced in exterior applications), cutting during or prior to installation, application of screws or other fasteners, or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While relative dimensions described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of functional blocks of various embodiments, the functional blocks are not necessarily indicative of the division between hardware or circuitry. Thus, for example, one or more of the functional blocks may be implemented in a single piece of hardware or equipment. The various embodiments are not limited to the arrangements and instrumentality shown in the drawings.

What is claimed is:

1. A method for providing a simulated appearance to a structural member, the method comprising: providing a substrate; applying plural intermediate layers including a print layer to the substrate, the print layer including plural sublayers individually applied and stacked vertically on top of one another, the plural sublayers either at least partially transparent or translucent to light in the visible spectrum and configured to provide a wood grain appearance, wherein a first portion of the wood grain appearance is provided by a first sublayer, and a different, second portion of the wood grain appearance is provided by a second sublayer; and applying a top coat outward of the plural intermediate layers.

2. The method of claim 1, wherein a base of the top coat comprises a fluoropolymer and the additive comprises plural inorganic particles.

3. The method of claim 2, wherein the fluoropolymer comprises Polyvinylidene Fluoride (PVDF) and the inorganic particles comprise an Aluminum Oxide ($Al_2O_3$).

4. The method of claim 1, wherein the intermediate layers comprise a print undertone layer interposed between the print layer and the substrate, the print undertone layer configured to simulate a base color that is lighter than a color of the wood grain appearance.

5. The method of claim 1, further comprising providing a foil comprising the plural intermediate layers, wherein applying the plural intermediate layers comprises applying the foil to the substrate.

6. The method of claim 1, wherein applying the plural intermediate layers comprises thermally applying the plural intermediate layers and wherein applying the top coat comprises at least one of spraying or curtain coating the top coat over an exterior of the plural intermediate layers.

7. The method of claim 1, further comprising curing the top coat after the top coat is applied, wherein the curing is configured to lock in a positioning of the additive with the base.

8. The method of claim 1, wherein the plural sublayers provide the appearance of a cathedral wood grain having a leading edge, an intermediate portion, and a trailing edge, wherein the leading edge is provided by the first sublayer, the intermediate portion is provided by the second sublayer, and the trailing edge is provided by a third sublayer.

* * * * *